Patented June 6, 1950

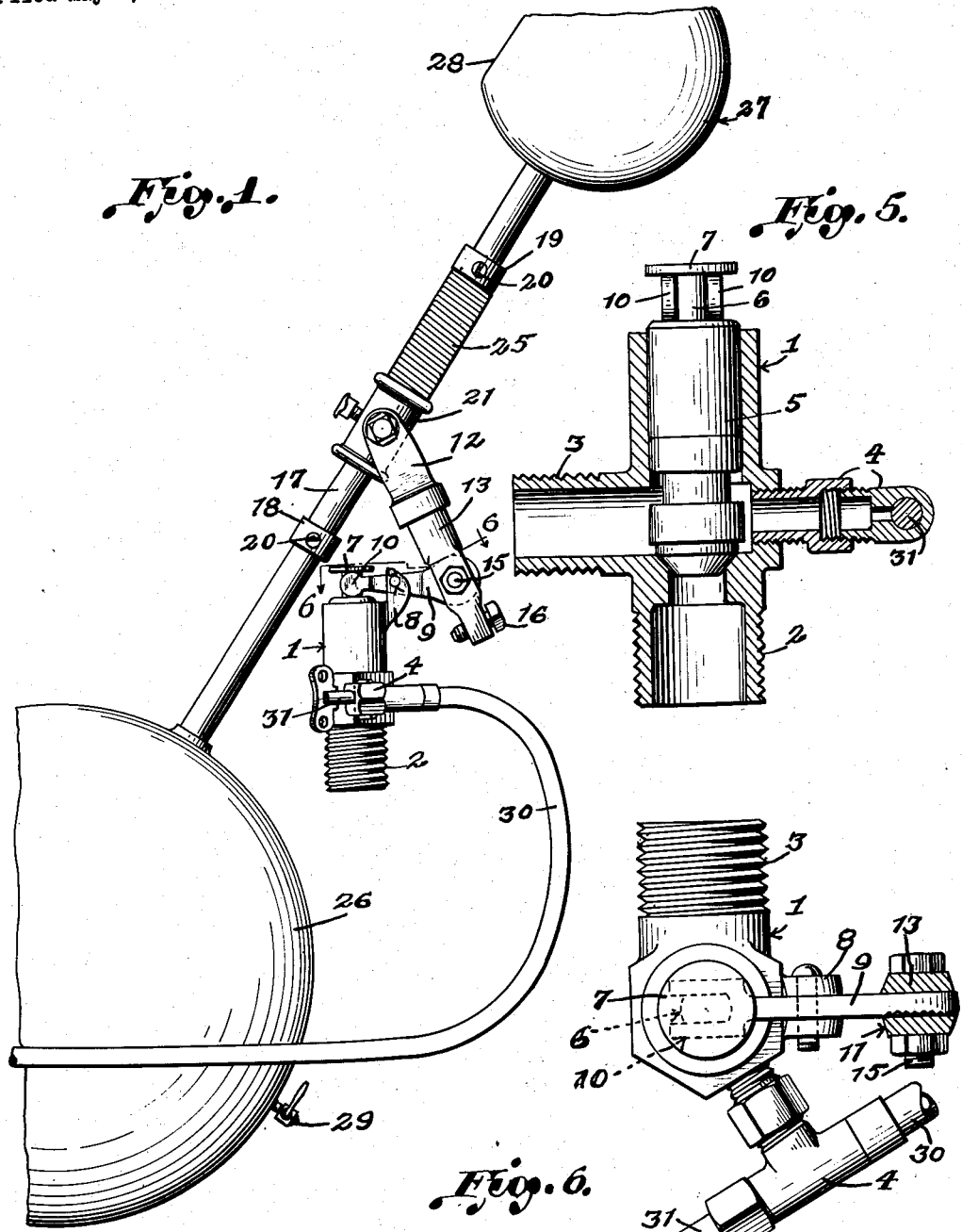

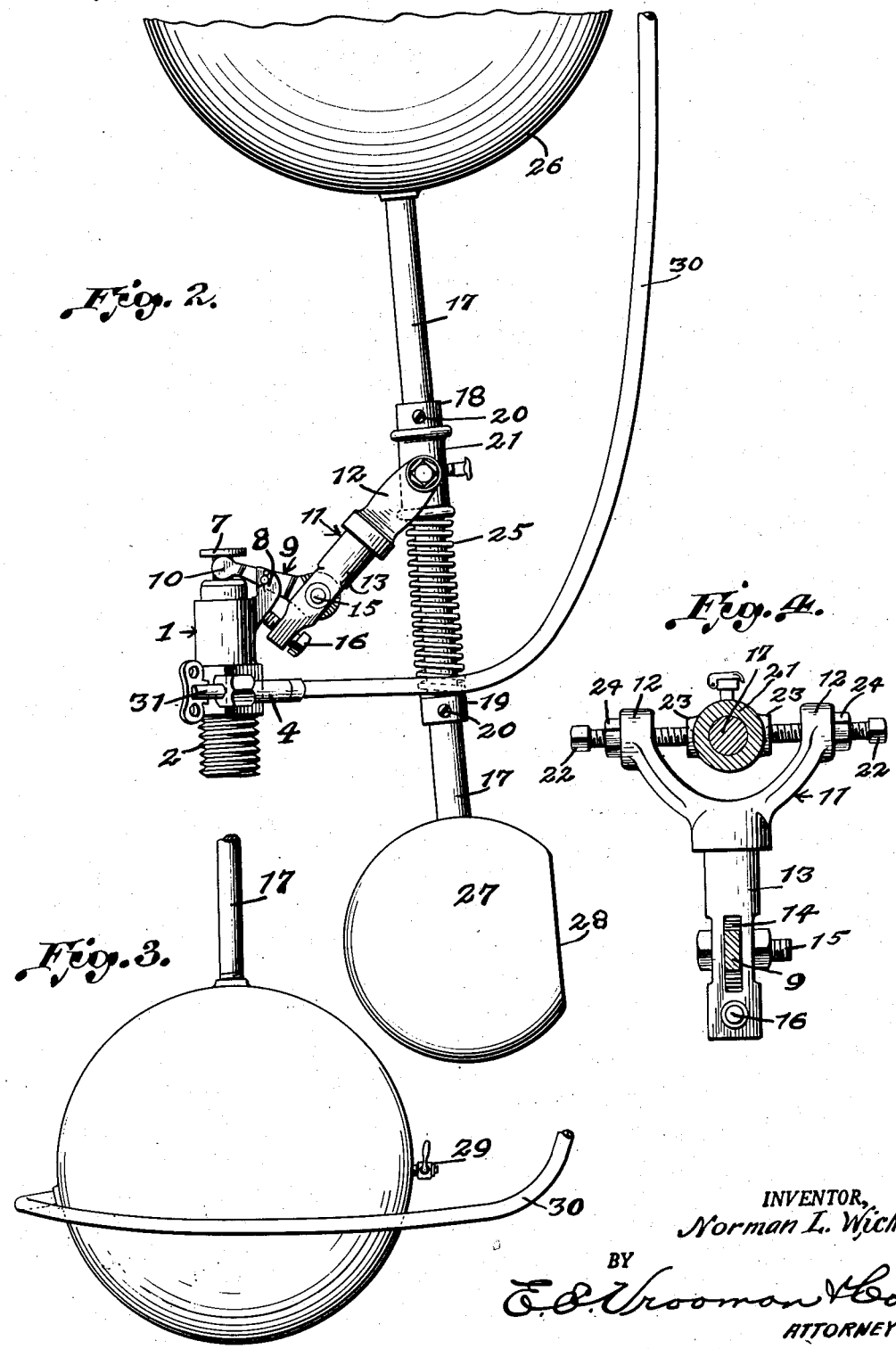

2,510,488

UNITED STATES PATENT OFFICE 2,510,488

AUTOMATIC VALVE

Norman L. Wicks, Sacramento, Calif.

Application May 8, 1946, Serial No. 668,281

5 Claims. (Cl. 137—145)

This invention relates to an automatic valve mechanism used in connection with an underground or surface sprinkler system or systems.

An object of the invention is the construction of a simple and efficient valve mechanism for controlling the flow of water through the sprinkler system.

Another object of the invention is the provision of an automatic valve mechanism in which two ball-like units are employed in controlling the opening and closing of a valve unit of a sprinkler system.

A still further object of the invention is the construction of an automatic valve mechanism that comprises a minimum number of parts, efficient in operation, and comparatively inexpensive to manufacture.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Figure 1 is a view in side elevation of a mechanism constructed in accordance with the present invention, showing the primary valve in a closed position, while Figure 2 is a similar view, showing said valve in an open position.

Figure 3 is a fragmentary plan view of the mechanism, showing particularly the hollow ball.

Figure 4 is an enlarged fragmentary view, partly in elevation and partly in section, showing particularly the yoke device.

Figure 5 is an enlarged view partly in elevation and partly in vertical section, of the primary valve.

Figure 6 is an enlarged plan view taken on line 6—6, Fig. 1 and looking in the direction of the arrows.

Referring to the drawings, in which the preferred embodiment of the invention is illustrated, 1 designates the primary valve casing which is provided with a depending externally-threaded extension 2, and with a horizontal laterally extending externally-threaded extension 3. An auxiliary valve casing 4 is detachably mounted on valve casing 1. A vertically slidable valve 5 is mounted in valve casing 1, this valve being provided with a stem 6 having an integral head or cap 7. A bifurcated bracket 8 extends from the side of the valve casing 1 and a valve lever 9 is pivotally mounted upon said bracket 8. The valve lever 9 is bifurcated at its outer end 10, and straddles the valve stem 6, under cap 7.

A yoke device 11, Fig. 4, is provided with a pair of arms 12, and a depending stem 13. Stem 13 has a slot 14 into which extends the inner end of valve lever 9. By means of a bolt 15 said yoke device 11 is pivotally mounted upon said valve lever 9. A bolt 16 is mounted upon the lower end of stem 13, and the inner end of said bolt 16 is adapted to engage bracket 8 when the mechanism is in an open position, as clearly shown in Figure 2.

A rod or shaft 17 is employed with fixed collars 18 and 19 thereon. These collars are adjustable longitudinally of shaft 17 for efficient operation of the mechanism. Each collar 19 is provided with a screw 20 for retaining the collar in a fixed adjusted position upon shaft 17. A slidable sleeve 21 is mounted upon shaft 17 between collars 18 and 19. The arms 12 of yoke device 11 are provided with screw bolts 22, Fig. 4, the inner ends of which engage suitable bearings 23 on sleeve 21, whereby sleeve 21 is capable of pivotal movement upon the yoke device 11. Lock nuts 24 are on the bolts 22, against arms 12 for holding the bolts in an adjusted position. A coil spring 25 is on shaft 17 between sleeve 21 and collar 19.

A hollow container or ball 26 is detachably mounted on one end of shaft 17 and a ball-like weight 27 is detachably mounted on the other end of shaft 17. The ball-like weight 27 is flattened at 28. The hollow container of ball 26 is provided with a pet cock 29 for draining the ball 26, as hereinafter described. A suitable hose 30 is connected at one end to valve casing 4, and at its other end it is connected to the container or ball 26, as shown in Figure 3. A manually operated valve 31 is mounted upon valve casing 4 for controlling the amount of water that is permitted to pass through hose 30 into hollow ball 26.

The operation of the mechanism is as follows: The extension 2 is attached to a water supply. The water is intended to pass up and through the casing, including extension 3 into the sprinkler system. When the mechanism is in the open position as shown in Figure 2, the valve 5 is in a raised position thus allowing the water to flow into the sprinkler system, and at the same time water is passing through hose 30 into the hollow ball 26. The amount of water passing through hose 30 can be manually controlled by adjusting valve 31. When the water in ball 26 is of sufficient quantity, the weight thereof overbalances weight 27 and causes a counterclockwise rotation of sleeve 21 about bolts 22 until sleeve 21 engages yoke device 11. The yoke arm and container then moves forward as a unit until the stem 13 engages upon valve lever 9, which is pivotally mounted upon bracket 8. Continued movement of the container 26, yoke 11, and lever arm 9 then causes the lever arm 9 to apply pressure to the valve 5 to effect its closing. Closing of the valve 5 shuts off water through the valve casing 1 and hose 30. When the valve 5 has closed, the weight of the water in the container 26 will cause a sliding movement of the shaft 17 in the sleeve 21, causing spring 25 to be compressed. At the same time the water is stopped flowing into ball 26 it will begin to flow out of pet cock 29, thus in time substantially all of the water is drained from ball 26. When ball 26 is substantially drained and light enough, compressed spring 25, Fig. 1, will tend to shove the shaft 17 upward, through sleeve 21, thus allowing the weight 27 to move more rapidly downwardly, to the position shown in Figure 2. When the weight 27 is in its downward position the valve 5 will be again in an open position, thus allowing the water to pass to the sprinkler system, and also water to pass to ball 26. This cycle of movement is automatically repeated for the efficient watering or sprinkling operation. The rapidity of the cycle of movement is controlled by the operator, by the degree to which he adjusts the pet cock 29 and the valve 31.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In an automatic valve mechanism, the combination of a valve casing, a movable valve within said casing, a valve lever movably engaging at its inner end said valve for opening and closing said valve when movement is imparted to said valve lever, means pivotally supporting said valve lever between its ends on said valve casing, a yoke device pivotally mounted on the outer end of said valve lever, whereby movement of said yoke device will cause movement of said valve lever and said valve, a shaft and means pivotally connecting same near its middle to the outer end of said yoke device, said shaft provided with two ends, a container secured to one end of said shaft, a weight secured to the other end of said shaft, a hose in communication at one end with the interior of said valve casing downstream of said valve and at its other end in communication with the interior of said container, and an exhaust cock on said container the arrangement being such that when the weight of the container and its contents exceeds that of the weight, the valve will be moved to closed position and when the weight of the container and its contents is less than that of the weight, the valve will be moved to open position.

2. In an automatic valve mechanism, the combination of a valve casing, a movable valve within said casing, a valve lever movably engaging at its inner end said valve for opening and closing said valve when movement is imparted to said valve lever, means pivotally supporting said valve lever between its ends on said valve casing, a yoke device having one end of said valve lever therein, means pivotally connecting said yoke device and valve lever, said yoke device being provided with a pair of arms, a shaft positioned near its middle between said pair of arms, means carried by said arms pivotally supporting said shaft upon said yoke device, said shaft provided with two ends, a container secured to one end of said shaft, a weight secured to the other end of said shaft, a hose in communication at one end with the interior if said valve casing and downstream of said valve and at its other end in communication with the interior of said container, and an exhaust cock on said container the arrangement being such that when the weight of the container and its contents exceeds that of the weight, the valve will be moved to closed position and when the weight of the container and its contents is less than that of the weight, the valve will be moved to open position.

3. In an automatic valve mechanism, the combination of a valve casing, a movable valve within said casing, a valve lever movably engaging at its inner end said valve for opening and closing said valve when movement is imparted to said valve lever, means pivotally supporting said valve lever between its ends on said valve casing, a yoke device pivotally mounted on the outer end of said valve lever, whereby movement of said yoke device records movement of said valve lever and said valve, a shaft provided with a sliding sleeve, means pivotally connecting said yoke device to said sleeve, collars fixedly secured to said shaft, said sliding sleeve between said collars, and said sleeve normally engaging one of said collars, a coiled spring on said shaft between said sliding sleeve and one of said collars, said shaft provided with two ends, a container on one end and a weight on the other end of said shaft, means for conveying liquid from said valve casing downstream of said valve to said container, and exhaust means on said container the arrangement being such that when the weight of the container and its contents exceeds that of the weight, the valve will be moved to closed position and when the weight of the container and its contents is less than that of the weight, the valve will be moved to open position.

4. In an automatic valve mechanism, the combination of a sliding valve casing, a sliding valve within said casing, said sliding valve provided with a stem outside of said sliding valve casing, a valve lever provided with an inner bifurcated end straddling said valve stem, means pivotally supporting said valve lever between its ends on said sliding valve casing, a yoke on the outer end of said valve lever, means extending through a portion of said yoke device and through a portion of said valve lever pivotally connecting said valve lever and yoke device, said yoke device provided with spaced arms, a sleeve and means pivotally supporting said sleeve upon said arms, a shaft slidably mounted within said sliding sleeve, a spring supported by said shaft and normally pressing against said sliding sleeve, a container on one end of said shaft and a weight on the other end of said shaft, and means for supplying liquid from said valve casing downstream of said valve to said container, and means for exhausting liquid out of said container the arrangement being such that when the weight of the container and its contents exceeds that of the weight, the valve will be moved to closed position and when the weight of the container and its contents is less than that of the weight, the valve will be moved to open position.

5. In an automatic valve mechanism, the combination of a valve casing provided with a sliding valve therein, a valve lever having one end engaging said sliding valve for operating the same within said valve casing, means pivotally supporting said valve lever upon said valve casing, a yoke device pivotally mounted on the outer end of said valve lever, a shaft and means pivotally and slidably connecting said shaft to the outer end of said yoke device, said shaft provided at one end with a container and at its other end with a weight, and means for conducting liquid from said valve casing downstream of said valve to said container, and means for exhausing liquid from said container the arrangement being such that when the weight of the container and its contents exceeds that of the weight, the valve will be moved to closed position and when the weight of the container and its contents is less than that of the weight, the valve will be moved to open position.

NORMAN L. WICKS.

REFERENCES CITED

The following references are of record in the file of this patent:

UNITED STATES PATENTS

| Number | Name | Date |
|---|---|---|
| 511,075 | Franke | Dec. 19, 1893 |
| 706,289 | Young | Aug. 5, 1902 |
| 1,822,901 | DeLacy-Mulhall | Sept. 15, 1931 |
| 2,209,124 | Kooken | July 23, 1940 |